US010152585B2

(12) United States Patent
Bhosale et al.

(10) Patent No.: US 10,152,585 B2
(45) Date of Patent: Dec. 11, 2018

(54) SYSTEM AND METHOD OF PROVIDING AND VALIDATING ENHANCED CAPTCHAS

(71) Applicant: VOICEBOX TECHNOLOGIES CORPORATION, Bellevue, WA (US)

(72) Inventors: Vikrant Bhosale, Bothell, WA (US); Spencer John Rothwell, Seattle, WA (US); Ahmad Khamis Elshenawy, Lynnwood, WA (US)

(73) Assignee: VOICEBOX TECHNOLOGIES CORPORATION, Bellevue, WA (US)

( * ) Notice: Subject to any disclaimer, the term of this patent is extended or adjusted under 35 U.S.C. 154(b) by 0 days.

(21) Appl. No.: 15/275,720

(22) Filed: Sep. 26, 2016

(65) Prior Publication Data

US 2017/0068809 A1  Mar. 9, 2017

Related U.S. Application Data

(63) Continuation of application No. 14/846,923, filed on Sep. 7, 2015, now Pat. No. 9,519,766.

(51) Int. Cl.
*G06F 21/00* (2013.01)
*G06F 21/36* (2013.01)
(Continued)

(52) U.S. Cl.
CPC .............. *G06F 21/36* (2013.01); *G06F 21/31* (2013.01); *G06F 21/32* (2013.01); *G06F 2221/2133* (2013.01)

(58) Field of Classification Search
CPC .......... G06F 21/36; G06F 21/32; G06F 21/31; G06F 2221/2133
See application file for complete search history.

(56) References Cited

U.S. PATENT DOCUMENTS

| 7,197,459 B1 | 3/2007 | Harinarayan |
| 7,912,726 B2 | 3/2011 | Alshawi |

(Continued)

FOREIGN PATENT DOCUMENTS

| WO | 2017044368 | 3/2017 |
| WO | 2017044369 | 3/2017 |

(Continued)

OTHER PUBLICATIONS

Amazon, "Amazon Mechanical Turk API Reference", API Version Mar. 25, 2012, available at: http://awsdocs.s3.amazonaws.com/MechTurk/20120325/amt-API-20120325.pdf, 234 pages.

(Continued)

*Primary Examiner* — Kendall Dolly
(74) *Attorney, Agent, or Firm* — Ohlandt, Greeley, Ruggiero & Perle, L.L.P.

(57) ABSTRACT

The invention relates to a system and method of automatically distinguishing between computers and human based on responses to enhanced Completely Automated Public Turing test to tell Computers and Humans Apart ("e-captcha") challenges that do not merely challenge the user to recognize skewed or stylized text. A given e-captcha challenge may be specific to a particular knowledge domain. Accordingly, e-captchas may be used not only to distinguish between computers and humans, but also determine whether a respondent has demonstrated knowledge in the particular knowledge domain. For instance, participants in crowd-sourced tasks, in which unmanaged crowds are asked to perform tasks, may be screened using an e-captcha challenge. This not only validates that a participant is a human (and not a bot, for example, attempting to game the crowd-source task), but also screens the participant based on whether they can successfully respond to the e-captcha challenge.

22 Claims, 9 Drawing Sheets

(51) Int. Cl.
  *G06F 21/31* (2013.01)
  *G06F 21/32* (2013.01)

(56) References Cited

U.S. PATENT DOCUMENTS

| | | | |
|---|---|---|---|
| 7,966,180 B2 | 6/2011 | Bajaj | |
| 8,731,925 B2 | 5/2014 | Da Palma | |
| 8,805,110 B2 | 8/2014 | Rhoads | |
| 8,847,514 B1 | 9/2014 | Reynoso | |
| 8,849,259 B2 | 9/2014 | Rhoads | |
| 8,855,712 B2 | 10/2014 | Lord | |
| 8,886,206 B2 | 11/2014 | Lord | |
| 8,925,057 B1* | 12/2014 | Ansari | G06F 21/31 382/181 |
| 8,929,877 B2 | 1/2015 | Rhoads | |
| 9,008,724 B2 | 4/2015 | Lord | |
| 9,043,196 B1 | 5/2015 | Leydon | |
| 9,047,614 B2 | 6/2015 | Kalikivayi | |
| 9,190,055 B1 | 11/2015 | Kiss | |
| 9,361,887 B1 | 6/2016 | Braga | |
| 9,401,142 B1 | 7/2016 | Rothwell | |
| 9,436,738 B2 | 9/2016 | Ehsani | |
| 9,448,993 B1 | 9/2016 | Braga | |
| 9,452,355 B1 | 9/2016 | Lin | |
| 9,519,766 B1 | 12/2016 | Bhosale | |
| 9,734,138 B2 | 8/2017 | Rothwell | |
| 2002/0065848 A1 | 5/2002 | Walker | |
| 2003/0126114 A1 | 7/2003 | Tedesco | |
| 2004/0093220 A1 | 5/2004 | Kirby | |
| 2004/0138869 A1 | 7/2004 | Heinecke | |
| 2005/0108001 A1 | 5/2005 | Aarskog | |
| 2007/0044017 A1 | 2/2007 | Zhu | |
| 2007/0050191 A1 | 3/2007 | Weider | |
| 2007/0100861 A1 | 5/2007 | Novy | |
| 2007/0192849 A1 | 8/2007 | Golle | |
| 2007/0198952 A1 | 8/2007 | Pittenger | |
| 2007/0265971 A1 | 11/2007 | Smalley | |
| 2008/0046250 A1 | 2/2008 | Agapi | |
| 2009/0013244 A1 | 1/2009 | Cudich | |
| 2009/0122970 A1 | 5/2009 | Kearney | |
| 2009/0150983 A1* | 6/2009 | Saxena | G06F 21/36 726/7 |
| 2011/0054900 A1 | 3/2011 | Phillips | |
| 2011/0225629 A1* | 9/2011 | Pai | G06F 21/36 726/3 |
| 2011/0252339 A1 | 10/2011 | Lemonik | |
| 2012/0066773 A1 | 3/2012 | Weisberger | |
| 2012/0197770 A1 | 8/2012 | Raheja | |
| 2012/0232907 A1 | 9/2012 | Ivey | |
| 2012/0254971 A1* | 10/2012 | Hu | G06F 21/36 726/9 |
| 2012/0265528 A1 | 10/2012 | Gruber | |
| 2012/0265578 A1 | 10/2012 | Olding | |
| 2012/0284090 A1 | 11/2012 | Marins | |
| 2013/0054228 A1 | 2/2013 | Baldwin | |
| 2013/0132091 A1 | 5/2013 | Skerpac | |
| 2013/0231917 A1 | 9/2013 | Naik | |
| 2013/0253910 A1 | 9/2013 | Turner | |
| 2013/0262114 A1 | 10/2013 | Brockett | |
| 2013/0289994 A1 | 10/2013 | Newman | |
| 2013/0304454 A1 | 11/2013 | Kimberly | |
| 2013/0325484 A1 | 12/2013 | Chakladar | |
| 2014/0067451 A1 | 3/2014 | Balamurugan | |
| 2014/0156259 A1 | 6/2014 | Dolan | |
| 2014/0167931 A1 | 6/2014 | Lee | |
| 2014/0193087 A1 | 7/2014 | Conwell | |
| 2014/0196133 A1 | 7/2014 | Shuster | |
| 2014/0244254 A1 | 8/2014 | Ju | |
| 2014/0249821 A1 | 9/2014 | Kennewick | |
| 2014/0279780 A1 | 9/2014 | Dasgupta | |
| 2014/0304833 A1 | 10/2014 | Gujar | |
| 2014/0358605 A1 | 12/2014 | Balamurugan | |
| 2015/0006178 A1 | 1/2015 | Peng | |
| 2015/0095031 A1 | 4/2015 | Conkie | |
| 2015/0120723 A1 | 4/2015 | Deshmukh | |
| 2015/0128240 A1 | 5/2015 | Richards | |
| 2015/0154284 A1 | 6/2015 | Pfeifer | |
| 2015/0169538 A1 | 6/2015 | Reynolds | |
| 2015/0213393 A1 | 7/2015 | O'Neill | |
| 2015/0269499 A1 | 9/2015 | B | |
| 2015/0278749 A1 | 10/2015 | Bhagat | |
| 2015/0339940 A1 | 11/2015 | Aggarwal | |
| 2015/0341401 A1 | 11/2015 | Lee | |
| 2016/0012020 A1 | 1/2016 | George | |
| 2016/0048486 A1 | 2/2016 | Lopategui | |
| 2016/0048934 A1 | 2/2016 | Gross | |
| 2016/0285702 A1 | 9/2016 | Beausoleil | |
| 2016/0329046 A1 | 11/2016 | Gross | |
| 2016/0342898 A1 | 11/2016 | Ehsani | |
| 2017/0017779 A1 | 1/2017 | Huang | |
| 2017/0039505 A1 | 2/2017 | Bose | |
| 2017/0068651 A1 | 3/2017 | Rothwell | |
| 2017/0068656 A1 | 3/2017 | Braga | |
| 2017/0068659 A1 | 3/2017 | Rothwell | |
| 2017/0069039 A1 | 3/2017 | Kennewick | |
| 2017/0069325 A1 | 3/2017 | Braga | |
| 2017/0069326 A1 | 3/2017 | Rothwell | |

FOREIGN PATENT DOCUMENTS

| | | |
|---|---|---|
| WO | 2017044370 | 3/2017 |
| WO | 2017044371 | 3/2017 |
| WO | 2017044408 | 3/2017 |
| WO | 2017044409 | 3/2017 |
| WO | 2017044415 | 3/2017 |

OTHER PUBLICATIONS

Amazon, "Amazon Mechanical Turk Developer Guide", API Version Mar. 25, 2012, available at: http://awsdocs.s3.amazonaws.com/MechTurk/20120325/amt-dgi-20120325.pdf, 43 pages.

Amazon, "Amazon Mechanical Turk Getting Started Guide", API Version Mar. 25, 2012, available at http://awsdocs.s3.amazonaws.com/MechTurk/20120325/amt-gsg-20120325.pdf, 36 pages.

Amazon, "Amazon Mechanical Turk Requester UI Guide", API Version Mar. 25, 2012, available at http://awsdocs.s3.amazonaws.com/MechTurk/20120325/amt-ui-20120325.pdf, 59 pages.

Badenhorst, Jaco, et al., "Quality Measurements for Mobile Data Collection in the Developing World", SLTU, 2012, 7 pages.

Bontcheva, Kalina, et al. "Crowdsourcing Named Entity Recognition and Entity Linking Corpora", Handbook of Linguistic Annotation, Springer, 2014, 18 pages.

Braunschweig, Katrin, et al., "Enhancing Named Entity Extraction by Effectively Incorporating the Crowd", BTW Workshops, 2013, pp. 181-195.

Buchholz, Sabine, et al., "Crowdsourcing Preference Tests, and How to Detect Cheating", in INTERSPEECH 2011, 8 pages.

Callison-Burch, Chris, et al., "Creating speech and language data with Amazon's Mechanical Turk", Proceedings of the NAACL HLT 2010 Workshop on Creating Speech and Language Data with Amazon's Mechanical Turk, Association for Computational Linguistics, 2010, 12 pages.

Carmel, David, et al., "ERD'14: Entity Recognition and Disambiguation Challenge", ACM SIGIR Forum, vol. 48, No. 2, 2014, pp. 63-77.

De Vries, Nic J., et al., "A Smartphone-Based ASR Data Collection Tool for Under-Resourced Languages", Speech Communication, vol. 56, 2014, pp. 119-131.

Derczynski, Leon, et al., "Analysis of Named Entity Recognition and Linking for Tweets", Information Processing & Management, vol. 51, No. 2, 2015, pp. 32-49.

Draxler, Christoph, "Interfaces for Crowdsourcing Platforms", from "Crowdsourcing for Speech Processing: Applications to Data Collection, Transcription, and Assessment", Chapter 9, pp. 241-278, John Wiley & Sons, 2013, 48 pages.

Eickhoff, C. et al., "Increasing Cheat Robustness of Crowdsourcing Tasks", Information Retrieval, vol. 16, No. 2, 2013, 18 pages.

Eickhoff, Carsten, "How Crowdsourcable is Your Task?", Proceedings of the Workshop on Crowdsourcing for Search and Data Mining, Feb. 9, 2011, pp. 11-14.

(56) References Cited

OTHER PUBLICATIONS

Finin, Tim, et al., "Annotating Named Entities in Twitter Data With Crowdsourcing", Proceedings of the NAACL HLT 2010 Workshop on Creating Speech and Language Data With Amazon's Mechanical Turk, Association for Computational Linguistics, Jun. 2010, pp. 80-88.

Freitas, Joao, et al., "Crowd-sourcing Platform for Large-Scale Speech Data Collection", Proc. FALA, 2010, 4 pages.

Gadiraju, Ujwal, et al., "Understanding Malicious Behavior in Crowdsourcing Platforms: The Case of Online Surveys", CHI 2015—Conference on Human Factors in Computing Systems, Seoul, South Korea, Apr. 18, 2015, 10 pages.

Gennaro, Rosario, et al., "Non-Interactive Verifiable Computing: Outsourcing Computation to Untrusted Workers", Advances in Cryptology—CRYPTO 2010, Springer Berlin Heidelberg, 2010, 19 pages.

Hsueh, Pei-Yun, et al., "Data Quality from Crowdsourcing: A Study of Annotation Selection Criteria", Proceedings of the NAACL HLT Workshop on Active Learning for Natural Language Processing, Boulder, Colorado, Jun. 2009, pp. 27-35.

Hughes, Thad, et al., "Building Transcribed Speech Corpora Quickly and Cheaply for Many Languages", INTERSPEECH, 2010, 4 pages.

Ipeirotis, Panagiotis G., "Quality Management on Amazon Mechanical Turk", Proceedings of the ACM SIGKDD Workshop on Human Computation, ACM, Jul. 2010, pp. 64-67.

Kaufmann, Nicolas, et al., "More Than Fun and Money. Worker Motivation in Crowdsourcing—A Study on Mechanical Turk", Proceedings of the Seventeenth Americas Conference on Information Systems, AMCIS, vol. 11, Aug. 4, 2011, pp. 1-11.

Lawson, Nolan, et al., "Annotation Large Email Datasets for Named Entity Recognition with Mechanical Turk", Proceedings of the NAACL HLT 2010 Workshop on Creating Speech and Language Data With Amazon's Mechanical Turk, Association for Computational Linguistics, Jun. 2010, pp. 71-79.

Levenshtein, V., I., Binary Codes Capable of Correcting Deletions, Insertions, and Reversals, Soviet Physics—Doklady, vol. 10, No. 8, Feb. 1966, pp. 707-710.

Liu, Sean, et al., "A Collective Data Generation Method for Speech Language Models", Spoken Language Technology Workshop (SLT), 2010 IEEE, IEEE, 2010, 6 pages.

McGraw, "Collecting Speech from Crowds", from "Crowdsourcing for Speech Processing: Applications to Data Collection, Transcription, and Assessment", Chapter 3, pp. 37-71, John Wiley & Sons, 2013, 44 pages.

McGraw, Ian Carmichael, "Crowd-Supervised Training of Spoken Language Systems", Dissertation, Massachusetts Institute of Technology, 2012, 166 pages.

McGraw, Ian, et al., "Collecting Voices from the Cloud", LREC, 2010, 8 pages.

McGraw, Ian, et al., "How to Control and Utilize Crowd-Collected Speech", from "Crowdsourcing for Speech Processing: Applications to Data Collection, Transcription, and Assessment", Chapter 5, pp. 106-136, John Wiley & Sons, 2013, 40 pages.

Oleson, David, et al., "Programmatic Gold: Targeted and Scalable Quality Assurance in Crowdsourcing", Human Computation, Papers from the 2011 AAAI Workshop (WS-11-11), vol. 11, 2011, 6 pages.

Rutherford, Attapol T., et al., "Pronunciation Learning for Named-Entities Through Crowd-Sourcing", Proceedings of the 15th Annual Conference on the International Speech Communication Association, 2015, 5 pages.

Sabou, M. et al., "Crowdsourcing Research Opportunities: Lessons from Natural Language Processing", iKnow 2012—Proceedings of the 12th International Conference on Knowledge Management and Knowledge Technologies, Graz, Austria, Article 17, Sep. 5, 2012, 8 pages.

Sabou, Marta, et al., "Corpus Annotation through Crowdsourcing: Towards Best Practice Guidelines", Proceedings of the 9th International Conference on Language Resources and Evaluation, Reykjavik, Iceland, 2014, 8 pages.

Soleymani, Mohammad, et al., "Crowdsourcing for Affective Annotation of Video: Development of a Viewer-Reported Boredom Corpus", Proceedings of the ACM SIGIR 2010 Workshop on Crowdsourcing for Search Evaluation, Jul. 19, 2010, pp. 4-8.

Suzic, Sinisa, et al., "On the Realization of AnSpeechCollector, System for Creating Transcribed Speech Database", 2014, 4 pages.

Voyer, Robert, et al., "A Hybrid Model for Annotating Named Entity Training Corpora", Proceedings of the Fourth Linguistic Annotation Workshop, Association for Computational Linguistics, Jul. 15, 2010, pp. 243-246.

Wang, Gang, et al., Serf and Turf: Crowdturfing for Fun and Profit, Proceedings of the WWW, New York, Apr. 16, 2012, pp. 679-688.

\* cited by examiner

SYSTEM AND METHOD OF PROVIDING AND VALIDATING ENHANCED CAPTCHAS

CROSS-REFERENCE TO RELATED APPLICATIONS

This application is a continuation of U.S. patent application Ser. No. 14/846,923, filed Sep. 7, 2015, entitled "SYSTEM AND METHOD OF PROVIDING AND VALIDATING ENHANCED CAPTCHAS", which is hereby incorporated by reference herein in its entirety.

FIELD OF THE INVENTION

The invention relates to a system and method of automatically distinguishing between computers and human based on responses to enhanced Completely Automated Public Turing test to tell Computers and Humans Apart ("e-captcha") challenges that do not merely challenge the user to recognize skewed or stylized text.

BACKGROUND OF THE INVENTION

Automatically (e.g., by a computer) distinguishing between humans from computers in a networked computing environment, such as the Internet, is a difficult task. Many automated computational tasks are performed by computer processes (e.g., "bots") that automatically crawl websites to obtain content. Such bots are growing in sophistication and are able to provide inputs to websites and other online resources. Bots may increase traffic in online networks, reducing available bandwidth for actual human users. Furthermore, bots may increasingly be used for malicious activities, such as denial of service attacks.

Another way in which bots have been used to exploit computer networks is through crowd-sourced tasks. In the context of natural language understanding ("NLU"), crowds can generate creative input for open ended questions, which then can be used as bootstrapping data for NLU models. It is difficult, however, to prevent the use of bots that act as human responders in order to "game" the system.

Conventional Completely Automated Public Turing test to tell Computers and Humans Apart ("CAPTCHA")-style challenges have been developed in an attempt to distinguish humans from computers. Conventional CAPTCHA challenges provide an image of characters, typically skewed to make it difficult for bots to perform image recognition, but usually easy for the human brain to decipher. However, such challenges can be prone to image recognition techniques and also cannot be used to further screen respondents based on whether they know the answer to a challenge (i.e., to select only those respondents with a basic knowledge of particular subject matter). These and other drawbacks exist with conventional CAPTCHA challenges.

SUMMARY OF THE INVENTION

The invention addressing these and other drawbacks relates to a system and method of automatically distinguishing between computers and human based on responses to e-captcha challenges that do not merely challenge the user to recognize skewed or stylized text. For example, an e-captcha challenge may require a skill-based action to be completed. A skill-based action does not include merely recognizing text (whether or not skewed) from an image. Rather, the skill-based action may require a user to have some knowledge in a domain (e.g., answer a trivia question) or solve a problem (e.g., solve a math problem).

A database of e-captcha challenges may be maintained. A given e-captcha challenge may be specific to a particular knowledge domain. As such, e-captchas may be used not only to distinguish between computers and humans, but also to validate whether a human should be validated based on whether he can demonstrate knowledge in the particular knowledge domain. For instance, participants in crowd-sourced tasks, in which unmanaged crowds are asked to perform tasks, may be screened using an e-captcha challenge. This not only validates that a participant is a human (and not a bot, for example, attempting to game the crowd-source task), but also screens the participant based on whether they can successfully respond to the e-captcha challenge.

In another crowd-sourced example, a crowd-sourced task administrator may wish for only those participants who can utter a particular utterance to be able to participate in an unmanaged crowd task involving the collection of utterances from a crowd. This may be advantageous when seeking participants who can utter certain sounds to be able to participate. Alternatively, a crowd-sourced task administrator may wish for only those participants who cannot utter a particular utterance to be able to participate (in a sense, only those who fail the validation may participate). This may be advantageous when seeking participants who cannot utter certain sounds to be able to participate to be able to train natural language processors towards those individuals (e.g., to account for accents, twangs, etc.).

This may allow a crowd-sourced task administrator, who wishes to have only participants having certain knowledge relating to a given knowledge domain to perform the task, screen such participants. An e-captcha may be used to ensure that the participants have such knowledge (or else they will not be validated and will not be permitted to perform the task).

E-captchas may be used in other contexts as well. For example, a classic rock music site may wish to prevent bots from entering the music site as well as ensure only those who have a basic knowledge of classic rock be permitted to enter the site. In such a case, an e-captcha having an e-captcha challenge relating to classic rock (e.g., classic rock trivia, recognize all or a portion of a classic rock song, etc.) may be presented to users, who must satisfy the challenge in order to gain entry into the site. A gaming site, for enhanced enjoyment/challenge, may present an e-captcha having an embedded game having an objective that must be completed in order to gain entry into the gaming site. Other contexts may be used as well, as would be apparent based on the disclosure herein.

In some instances, an e-captcha may be required not only at the beginning of a session, but throughout the session. For instance, a user may be required to pass an e-captcha challenge to access a resource (e.g., a website), but also may be required to periodically pass additional e-captchas to continue with the session (or get kicked off).

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The invention addressing these and other drawbacks relates to a system and method of automatically distinguishing between computers and human based on responses to e-captcha challenges that do not merely challenge the user to recognize skewed or stylized text. As used herein, the term "e-captcha" may refer to information related to a challenge that must be satisfied (e.g., a question to be answered, a game objective to be complete, a problem to be solved, etc.), rather than merely an image of text to be reproduced, in order to pass validation. An e-captcha may include the challenge itself, client executable scripts or code that is configured to, when executed at the client, generate an interface for presenting and receiving a response to the e-captcha challenge, and/or other information related to an e-captcha challenge.

Exemplary System Architecture

Figure 1:
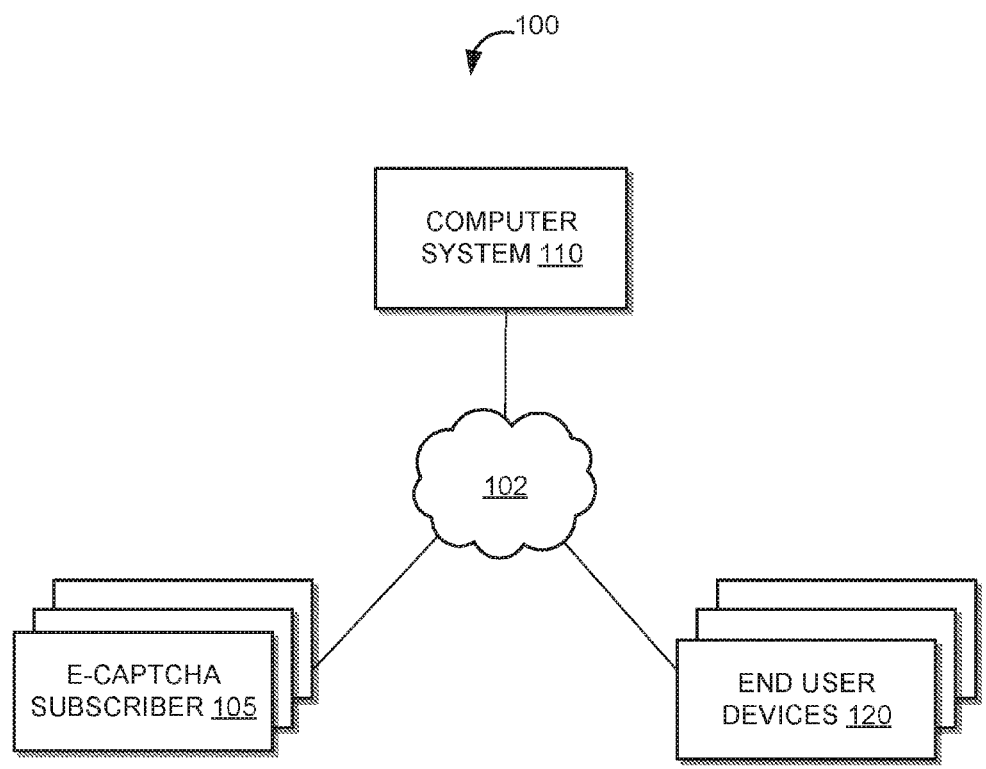
FIG. 1 illustrates a system for automatically distinguishing between computers and human based on responses to e-captcha challenges, and characterizing respondents based on the responses, according to an implementation of the invention.

FIG. 1 illustrates a system 100 for automatically distinguishing between computers and human based on responses to open-ended challenges, and characterizing respondents based on the responses, according to an implementation of the invention. In an implementation, system 100 may include an e-captcha subscriber 105, a computer system 110, an e-captcha database 112, one or more end user devices 120, and/or other components. Each component of system 100 may be communicably coupled to one another by one or more computer networks 102.

E-captcha subscriber 105 may include a system (e.g., operated by an entity) that wishes to automatically distinguish between computers and humans. For instance, e-captcha subscriber 105 may include a crowd-sourcing service that wishes to prevent bots from accomplishing tasks intended for unmanaged human crowds, a website operator that wishes to prevent bots from automatically accessing its website, and/or other systems that wish to automatically distinguish between computers and humans. E-captcha subscriber 105 may request e-captchas from computer system 110. In some implementations, e-captcha subscriber 105 may request certain types of e-captchas. For instance, e-captcha subscriber 105 may request an e-captcha relating a particular (knowledge/subject matter) domain, e-captchas having challenges in a particular format, e-captchas having response inputs in a particular format, and/or other types of e-captchas. Responsive to such requests, computer system 110 may provide and validate e-captchas, which may be obtained from e-captcha database 112.

Figure 3:
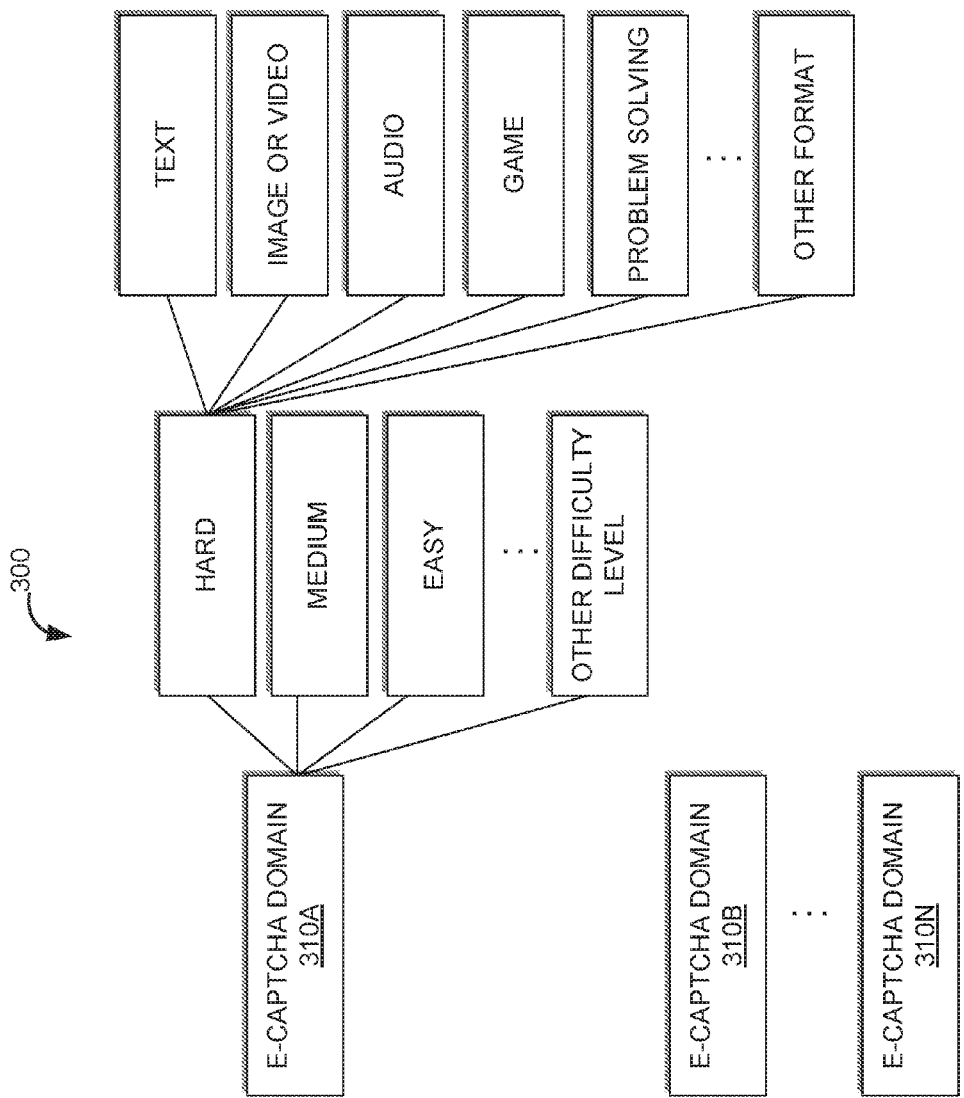
FIG. 3 illustrates a schematic diagram of types of e-captcha challenges, according to an implementation of the invention.

E-captcha database 112 may store information related to e-captchas. For instance, e-captcha database 112 may store e-captcha challenges, correct responses/solutions to the e-captcha challenges, e-captcha specifications, and/or other information described herein. An example of the types of e-captchas are illustrated in FIG. 3. End user device 120 may be provided with an e-captcha (whether through e-captcha subscriber 105 or from computer system 110), present a corresponding e-captcha challenge, receive a response to the challenge, and upload the response for validation. Computer system 110 may receive response, and provide either a validation or failure indication.

Having described a high level overview of the system, attention will now be turned to a more detailed description of computer system 110.

Figure 2:
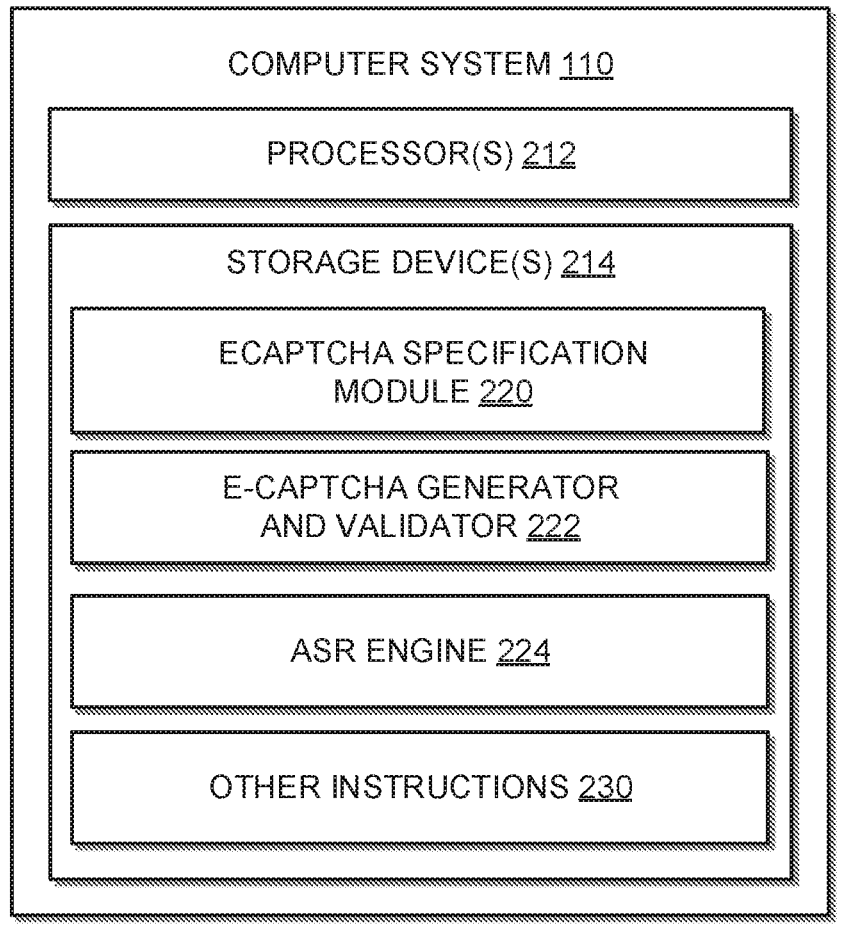
FIG. 2 illustrates a computer system for providing and validating e-captchas, according to an implementation of the invention.

FIG. 2 illustrates a computer system 110 for providing and validating e-captcha challenges, according to an implementation of the invention. Computer system 110 may be configured as a server, desktop computer, a laptop computer, and/or other device that can be programmed to provide and validate e-captcha challenges, as described herein.

Computer system 110 may include one or more processors 212 (also interchangeably referred to herein as processors 212, processor(s) 212, or processor 212 for convenience), one or more storage devices 214 (which may store various instructions described herein), and/or other components. Processors 212 may be programmed by one or more computer program instructions. For example, processors 212 may be programmed by an e-captcha specification module 220, an e-captcha generator and validator 222, an Automated Speech Recognition ("ASR") engine 224, and/or other instructions 230 that program computer system 110 to perform various operations.

As used herein, for convenience, the various instructions will be described as performing an operation, when, in fact, the various instructions program the processors 212 (and therefore computer system 110) to perform the operation.

Defining and Storing E-Captchas

In an implementation, e-captcha specification module 220 may obtain e-captcha challenges and their correct responses to be stored (e.g., in e-captcha database 112) and later provided to an e-captcha subscriber 105. A correct response may include a correct answer to a question, a completion of an objective (e.g., a completion of a level, a score achieved in a game, etc.), a solution to a problem (e.g., a solution to a math problem, a completion of a puzzle in a particular arrangement of puzzle pieces, etc.), and/or other response deemed suitable.

In some instances, a given response may be completely correct, partially correct, or incorrect. The response may be assigned a score based on its level of correctness according to one or more scoring parameters that specify how the response should be score. Such scoring parameters will be different depending on the type of e-captcha challenge to which they pertain. A given response may be deemed satisfactory if the score exceeds a predetermined threshold score. E-captcha specification module 220 may store the scoring parameters and the predetermined threshold score in e-captcha database 112.

In an implementation, e-captcha specification module 220 may obtain the e-captcha challenges and their correct responses from e-captcha subscriber 105. For instance, e-captcha subscriber 105 may provide its own set of challenges to be used to validate users. E-captcha specification module 220 may store the received set of challenges and store the challenges in e-captcha database 112 on behalf of e-captcha subscriber 105 and then later provide an appropriate e-captcha challenge to the subscriber for validating a user.

In an implementation, e-captcha specification module 220 may obtain the e-captcha challenges and their correct responses from an administrator of computer system 110, who may generate the challenges.

In an implementation, e-captcha specification module 220 may allow an e-captcha subscriber 105 to specify, in advance (before requesting an e-captcha for validating a user), which set of e-captchas should be provided when requested. For instance, e-captcha specification module 220 may present a selectable listing of knowledge domains, types, levels of difficulty, and/or other e-captcha parameters to specify e-captchas. In this manner, a given e-captcha subscriber 105 may specify certain types of e-captcha challenges to validate users.

Types of E-Captchas

FIG. 3 illustrates a schematic diagram 300 of types of e-captcha challenges, according to an implementation of the invention. The subject matter of a given e-captcha challenge may be part of an e-captcha domain 310 (illustrated in FIG. 3 as e-captcha domain 310A, 310B, . . . , 310N). A given e-captcha domain 310 may relate to different subject matter such as, without limitation, business listings, sports, politics, music, travel, and/or other domains of information. As illustrated, only as e-captcha domain 310A is shown being associated with a "HARD," "MEDIUM," "EASY," AND "OTHER DIFFICULTY LEVEL" for convenience. Other e-captcha domains 310 may be associated with such levels of difficulty as well. Furthermore, as illustrated, only the "HARD" level of difficulty is associated with various types of formats, likewise for convenience. Other levels of difficulty may be associated with various types of formats as well. The difficulty level may indicate a level of difficulty assigned to the e-captcha challenge. An administrator of computer system 110, e-captcha subscriber 105, and/or others may assign the level of difficulty.

In an implementation, an e-captcha challenge may be configured in various formats, such as text, image or video, audio, a game, a problem solving, and/or other format. It should be noted that text formats may be converted into and presented in an image format. For instance, a question in text format: "What state is known as the Evergreen State?" may be converted into an image format prior to presentation to a user. Although not illustrated, other characteristics of the e-captcha challenge may be stored as well, such as a response mechanism (e.g., open text, multiple choice, utterance, gesture, etc.) used to respond to the challenge.

In the illustrated implementation, a given e-captcha challenge may be selected for validating a user based on a desired e-captcha domain 310, a level of difficulty, a format of the question, a response mechanism, and/or other characteristic known about the e-captcha challenge. In this manner, different types of e-captcha challenges may be selected and presented to validate a user.

Providing and Validating E-Captchas

Referring back to FIG. 2, in an implementation, e-captcha generator and validator 222 may select and provide an e-captcha (which may include an e-captcha challenge and/or other information).

Figure 4:
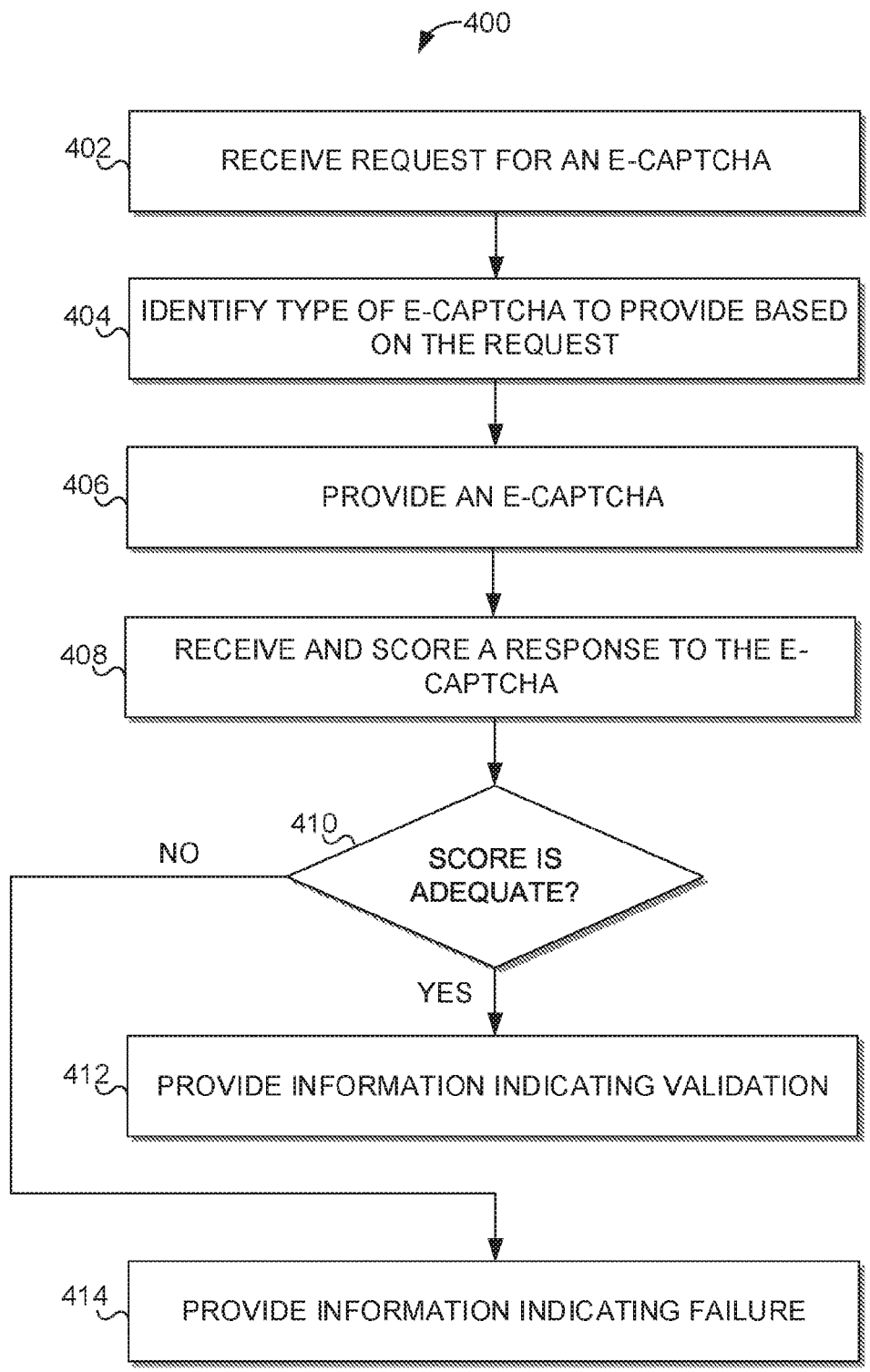
FIG. 4 illustrates a flow diagram of a process of providing and validating e-captchas, according to an implementation of the invention.

FIG. 4 illustrates a flow diagram of a process 400 of providing and validating e-captchas, according to an implementation of the invention. Process 400 may be performed by e-captcha generator and validator 222 and/or other component of system 100 programmed to perform process 400.

In an implementation, in an operation 402, process 400 may include receiving a request for an e-captcha. The request may be received from an e-captcha subscriber 105, who wishes to validate one of its users. Alternatively, the request may be received from an agent operating on end user device 120. The agent may include code that programs end user device 120 to request an e-captcha and communicates with e-captcha subscriber 105 or computer system 110 to provide a response.

In an implementation, in an operation 404, process 400 may include identifying a type of e-captcha to provide based on the request. For example, the request may include an e-captcha specification that includes one or more e-captcha parameters that specify the type of e-captcha requested. For example, the e-captcha parameters may specify an e-captcha domain 310, a level of difficulty, a format (e.g., text, image or video, of the challenge, audio, game, problem solving, etc.), a response mechanism, and/or other characteristic of an e-captcha challenge.

In some instances, the request may include identifying information that identifies an e-captcha subscriber 105 associated with the request. In these instances, process 400 may include obtaining a pre-stored profile that includes e-captcha parameters predefined for the e-captcha subscriber. In instances where the request does not specify any e-captcha parameter or e-captcha subscriber identifying information, process 400 may include randomly identifying an e-captcha to provide.

In an implementation, in an operation 406, process 400 may include causing the e-captcha to be provided. For instance, an e-captcha may include the identified e-captcha challenge, code necessary to present and receive a response to the e-captcha challenge, and/or other information. In instances where code is provided in an e-captcha, the e-captcha may be configured as a standalone agent able to be executed at the client. For instance, the e-captcha may be configured as a JavaScript, Microsoft® Silverlight®, Adobe Flash™ technology scripts, HTML5, and/or other client executable instructions that include an e-captcha challenge and instructions configured to cause the e-captcha challenge to be displayed. In other instances, the e-captcha may include only the e-captcha challenge, in which case the recipient (e.g., e-captcha subscriber 105 or end user device 120) will configure the e-captcha challenge to be displayed and provide response.

In an implementation, in an operation 408, process 400 may include receiving and scoring a response to the e-captcha (i.e., response to the e-captcha challenge). In implementations where the response mechanism is a text (free-form) input, the score may be based on a comparison of the text to text from the correct response (which may be retrieved from e-captcha database 112). An edit distance, a measure of dissimilarity between the response and the correct response may be used to determine the score. In implementations where the response mechanism is a gesture and text input is expected, the gesture may be converted to text and the aforementioned edit distance analysis may be conducted. Such gesture to text may be performed by the end user device 120 and/or process 400. In implementations where the response mechanism is a gesture and a shape is expected, conventional shape analysis may performed to determine a level of matching between the input gesture shape and the correct shape. In implementations where the response mechanism is an utterance, process 400 may use ASR engine 224 to convert the utterance to a string, and the aforementioned edit distance analysis may be conducted.

In an implementation, in an operation 410, process 400 may include determining whether the score is adequate. For instance, the score may be compared to a predetermined score threshold.

In an implementation, in an operation 412, responsive to a determination that the score is adequate, process 400 may include providing information indicating validation. In these implementations, the user providing the response is presumptively a human having sufficient knowledge of the subject matter of the e-captcha challenge and may permitted to continue on to a next step, whether that includes being permitted to participate in a crowd-sourced task, continue to a website, etc.

In an implementation, in an operation 414, responsive to a determination that the score is inadequate, process 400 may include providing information indicating failure. In these implementations, the user providing the response is presumptively a computer/bot or a human having insufficient knowledge of the subject matter of the e-captcha challenge. In either case, the user may not be permitted to continue on to a next step, whether that includes being permitted to participate in a crowd-sourced task, continue to a website, etc.

Figure 5:
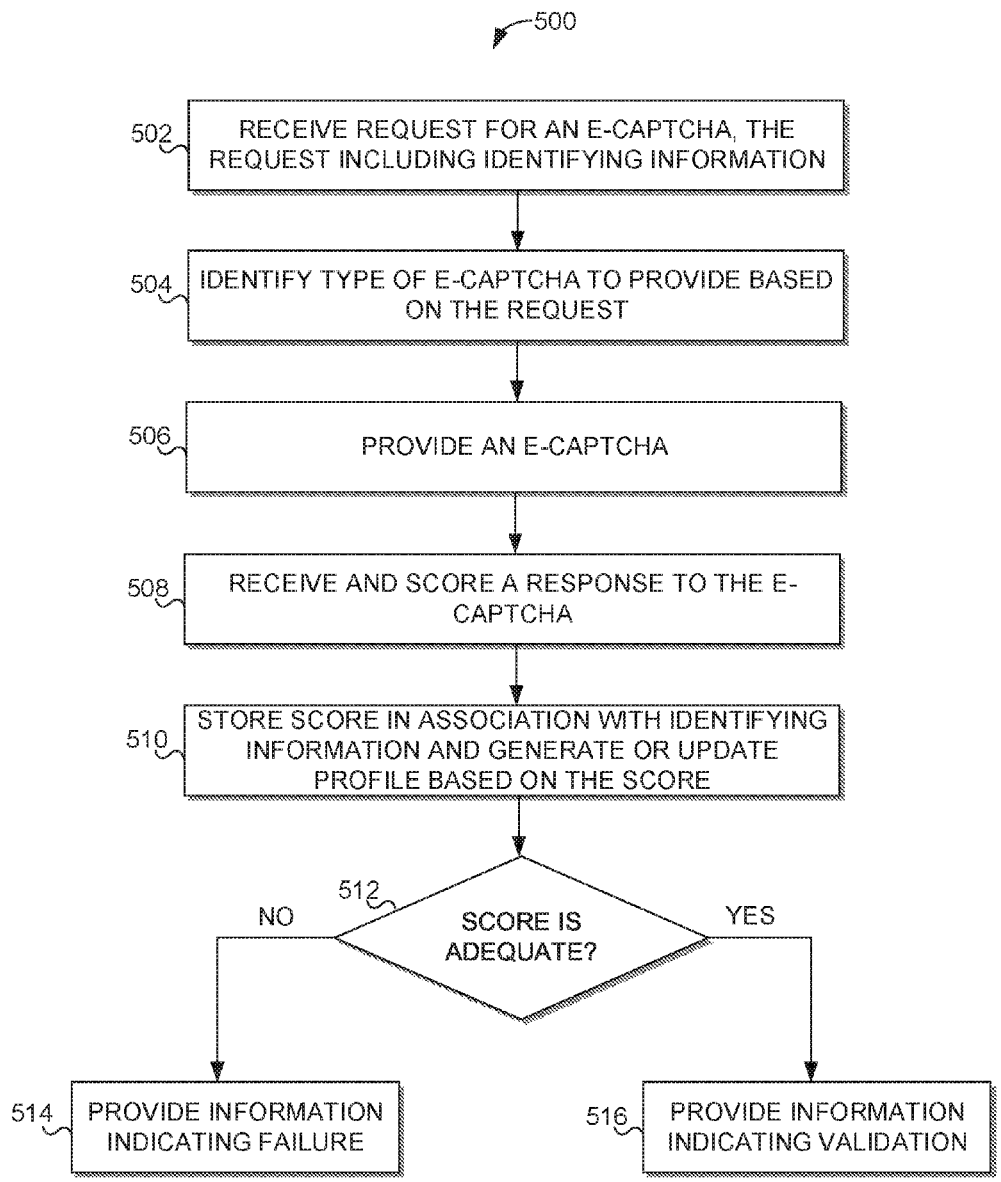
FIG. 5 illustrates a flow diagram of characterizing respondents based on responses to e-captcha challenges, according to an implementation of the invention.

FIG. 5 illustrates a flow diagram 500 of characterizing respondents based on responses to e-captcha challenges, according to an implementation of the invention. Process 500 may be performed by e-captcha generator and validator 222 and/or other component of system 100 programmed to perform process 500.

In an implementation, in an operation 502, process 400 may include receiving a request for an e-captcha. The request may be received from an e-captcha subscriber 105 or from an agent operating on end user device 120, in a manner similar to operation 402. In operation 502, the request may include identifying information that identifies a user or an end user device 120.

In an implementation, in an operation 504, process 500 may include identifying a type of e-captcha to provide based on the request, in a manner similar to operation 404.

In an implementation, in an operation 506, process 500 may include causing the e-captcha to be provided, in a manner similar to operation 406.

In an implementation, in an operation 508, process 500 may include receiving and scoring a response to the e-captcha, in a manner similar to operation 408.

In an implementation, in an operation 510, process 500 may include storing the score in association with the identifying information. For instance, over time, scores associated with the identifying information may be used to build a profile of the user or the end user device 120 identified by the identifying information. In this manner, process 500 may understand the types of e-captchas that have been successfully or unsuccessfully completed by a user (or end user device 120). Alternatively or additionally, the profile of the user may be used to disqualify the user if the user does not maintain a certain number or percentage of validations per attempts.

In an implementation, in an operation 512, process 500 may include determining whether the score is adequate. For instance, the score may be compared to a predetermined score threshold.

In an implementation, in an operation 514, responsive to a determination that the score is inadequate, process 500 may include providing information indicating failure.

In an implementation, in an operation 516, responsive to a determination that the score is adequate, process 500 may include providing information indicating validation.

Figure 6A:
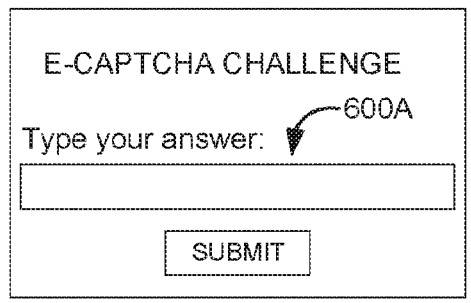
FIG. 6A illustrates a response mechanism for an e-captcha challenge, according to an implementation of the invention.

FIG. 6A illustrates a response mechanism 600A for an e-captcha challenge, according to an implementation of the invention. As illustrated, response mechanism 600A includes a free-form text input.

Figure 6B:
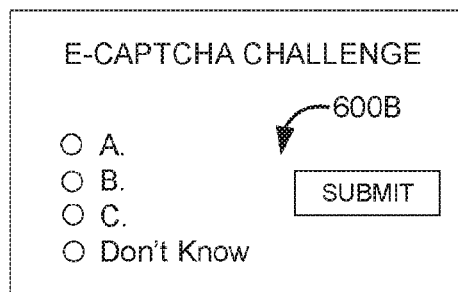
FIG. 6B illustrates a response mechanism for an e-captcha challenge, according to an implementation of the invention.

FIG. 6B illustrates a response mechanism 600B for an e-captcha challenge, according to an implementation of the invention. As illustrated, response mechanism 600B includes a free-form multiple choice input.

Figure 6C:
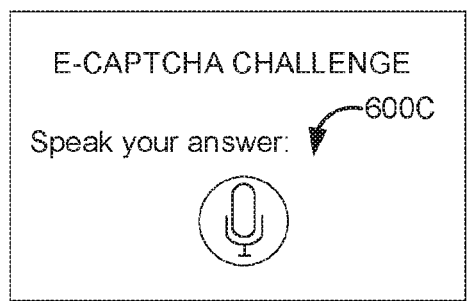
FIG. 6C illustrates a response mechanism for an e-captcha challenge, according to an implementation of the invention.

FIG. 6C illustrates a response mechanism 600C for an e-captcha challenge, according to an implementation of the invention. As illustrated, response mechanism 600C includes a voice/audio input.

Figure 6D:
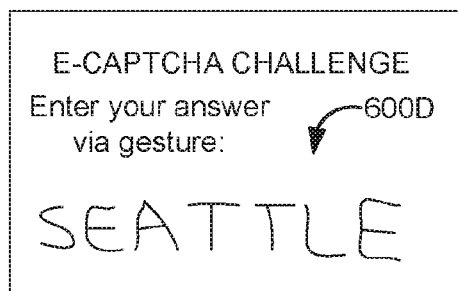
FIG. 6D illustrates a response mechanism for an e-captcha challenge, according to an implementation of the invention.

FIG. 6D illustrates a response mechanism 600D for an e-captcha challenge, according to an implementation of the invention. As illustrated, response mechanism 600D includes a gesture-based input. In these instances, the gesture-based input may receive a gesture, e.g., a motion or series of motions across a touchscreen input device, and/or other free-form gesture inputs.

Each response mechanism illustrated in FIGS. 6A-6D may be combined with one or more response mechanisms (of the same or different type) to form compound e-captcha challenges (e.g., those having multiple parts).

Figure 7A:
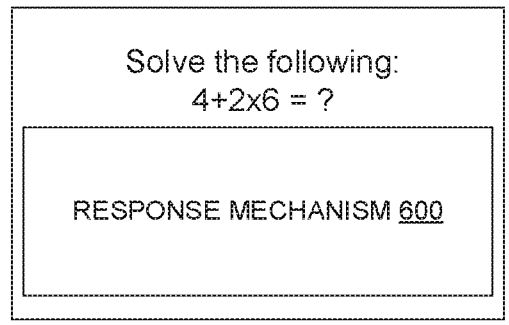
FIG. 7A illustrates a math solution type of e-captcha challenge, according to an implementation of the invention.

FIG. 7A illustrates a math solution type of e-captcha challenge, according to an implementation of the invention. Different types of response mechanisms (illustrated in FIGS. 6A-6D) may be used to receive responses to the math solution type of e-captcha challenge.

Figure 7B:
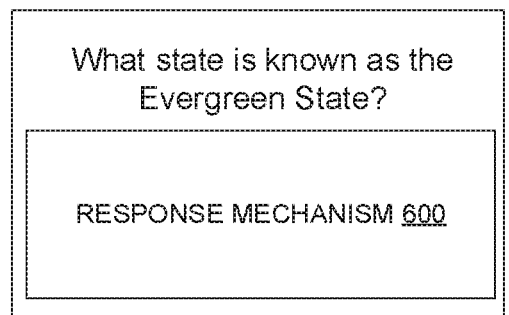
FIG. 7B illustrates a trivia question type of e-captcha challenge, according to an implementation of the invention.

FIG. 7B illustrates a trivia question type of e-captcha challenge, according to an implementation of the invention. Different types of response mechanisms (illustrated in FIGS. 6A-6D) may be used to receive responses to the trivia question type of e-captcha challenge.

Figure 7C:
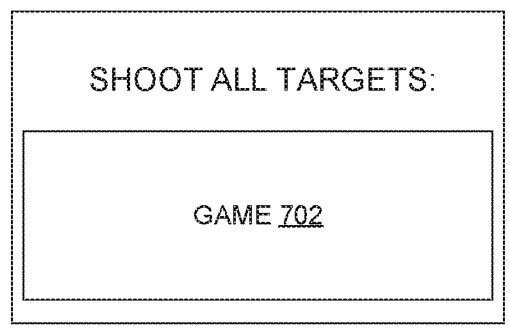
FIG. 7C illustrates a game type of e-captcha challenge, according to an implementation of the invention.

FIG. 7C illustrates a game type of e-captcha challenge, according to an implementation of the invention. In this implementation, the e-captcha may include code that, when executed by the end user device 120, programs the device to instantiate a game that has an objective to be reached. A score may be assessed for the game based on a level of completion of the objective (e.g., number of "targets" destroyed in the game). The score may be used to determine whether the e-captcha challenge has been validated.

Figure 7D:
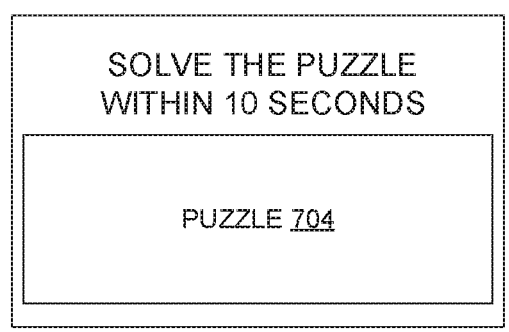
FIG. 7D illustrates a puzzle solution type of e-captcha challenge, according to an implementation of the invention.

FIG. 7D illustrates a puzzle solution type of e-captcha challenge, according to an implementation of the invention. In this implementation, the e-captcha may include code that, when executed by the end user device 120, programs the device to instantiate a puzzle (e.g., word search, crossword, jigsaw, etc.) that has a corresponding solution. A score may be assessed for the game based on a level of completion of the objective (e.g., number of words found, level of completion of the jigsaw, etc.). The score may be used to determine whether the e-captcha challenge has been validated. As illustrated, the e-captcha may impose a time limit by which the objective should be reached. When the time limit expires, a score may be generated to determine whether the level of completion is sufficient to validate the user. A time limit may be imposed for other types of e-captcha challenges as well.

Figure 7E:
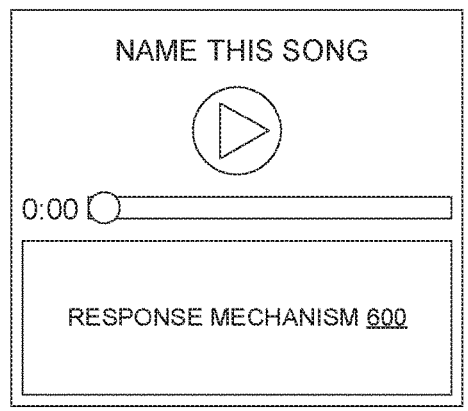
FIG. 7E illustrates an audio recognition type of e-captcha challenge, according to an implementation of the invention.

FIG. 7E illustrates an audio recognition type of e-captcha challenge, according to an implementation of the invention. In this implementation, the e-captcha may include at least a portion (or all) of an audio clip and the challenge is to correctly name the song or other source of the audio (e.g., an artist or band who sings the song, a movie from which the audio clip was taken, etc). Different types of response mechanisms (illustrated in FIGS. 6A-6D) may be used to receive a response.

Figure 7F:
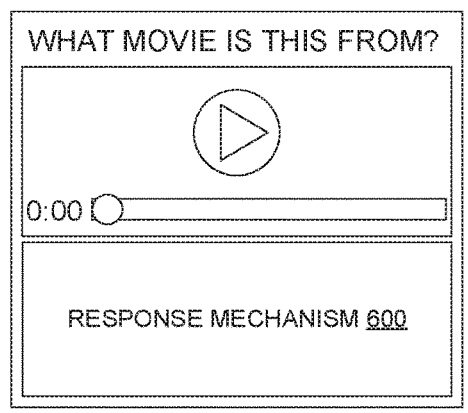
FIG. 7F illustrates a video recognition type of e-captcha challenge, according to an implementation of the invention.

FIG. 7F illustrates a video FTP type of e-captcha challenge, according to an implementation of the invention. In this implementation, the e-captcha may include at least a portion (or all) of a video clip and the challenge is to correctly name the source of the video clip (e.g., a movie from which the video clip was taken, etc). Different types of response mechanisms (illustrated in FIGS. 6A-6D) may be used to receive a response.

Figure 7G:
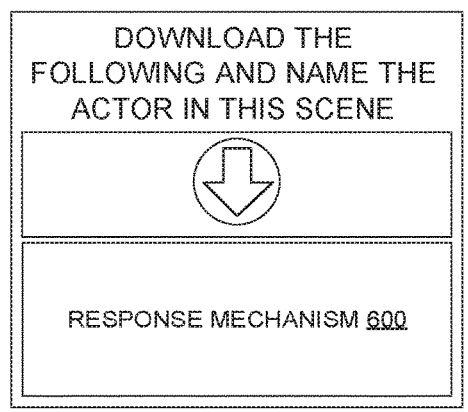
FIG. 7G illustrates a download requirement type of e-captcha challenge, according to an implementation of the invention.

FIG. 7G illustrates a download requirement type of e-captcha challenge, according to an implementation of the invention. In this implementation, the e-captcha may include a requirement to download (as opposed to stream) a file and describe the file. For example, the file may include an audio, video, image, text, and/or other type of file. Different types of response mechanisms (illustrated in FIGS. 6A-6D) may be used to receive a response after the user has downloaded and assessed the downloaded content.

Figure 7H:
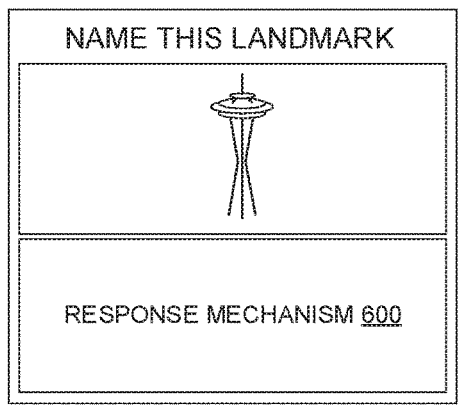
FIG. 7H illustrates an image recognition type of e-captcha challenge, according to an implementation of the invention.

FIG. 7H illustrates an image recognition type of e-captcha challenge, according to an implementation of the invention. In this implementation, the e-captcha may include an image and the challenge is to recognize an object (or objects) in the image. As illustrated, the challenge is to identify a real or depicted image of a landmark. Other types of recognitions may be required as well (e.g., recognize a painting, recognize a car, etc.). Different types of response mechanisms (illustrated in FIGS. 6A-6D) may be used to receive a response.

Figure 7I:
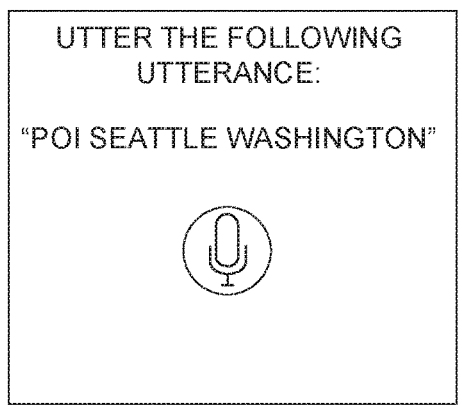
FIG. 7I illustrates an utterance type of e-captcha challenge, according to an implementation of the invention.

FIG. 7I illustrates an utterance type of e-captcha challenge, according to an implementation of the invention. In this implementation, the e-captcha may include an utterance to be uttered by the user. As illustrated, the user is prompted to utter "POI SEATTLE WASHINGTON." Other utterances may be prompted as well.

The one or more processors 212 illustrated in FIG. 2 may each include one or more physical processors that are programmed by computer program instructions. The various instructions described herein are exemplary only. Other configurations and numbers of instructions may be used, so long as the processor(s) 212 are programmed to perform the functions described herein.

Furthermore, it should be appreciated that although the various instructions are illustrated in FIG. 2 as being co-located within a single processing unit, in implementations in which processor(s) 212 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 212 may be programmed by one or more additional instructions that may perform some or all of the functionality attributed herein to one of the instructions.

The various instructions described herein may be stored in a storage device 214, which may comprise random access memory (RAM), read only memory (ROM), and/or other memory. The storage device may store the computer program instructions (e.g., the aforementioned instructions) to be executed by processor 212 as well as data that may be manipulated by processor 212. The storage device may comprise floppy disks, hard disks, optical disks, tapes, or other storage media for storing computer-executable instructions and/or data.

The various databases described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The various components illustrated in FIG. 1 may be coupled to at least one other component via a network 107, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

The various processing operations and/or data flows depicted in FIG. 3 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously.

Accordingly, the operations as illustrated (and described in greater detail below) are exemplary by nature and, as such, should not be viewed as limiting.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer implemented method of distinguishing between computers and humans through an enhanced completely automated public turing test to tell computers and humans apart (e-captcha) through skill-based actions, the method being implemented in a computer system having one or more physical processors programmed with computer program instructions that, when executed by the one or more physical processors, cause the computer system to perform the method, the method comprising:
   receiving, by the computer system, a request comprising an e-captcha specification, wherein the e-captcha specification comprises one or more parameters that specify a particular skill needed to solve the e-captcha and a specific domain to which the skill needed to solve the e-captcha is related;
   identifying, by the computer system, an e-captcha challenge based on the e-captcha specification, wherein the e-captcha challenge includes a skill-based action to be completed to validate that a user is a human user;
   providing, by the computer system, the e-captcha challenge via the network responsive to the request;
   receiving, by the computer system, a response to the e-captcha challenge via the network;
   determining, by the computer system, whether the skill-based action was at least partially correctly completed;
   generating, by the computer system, information indicating whether the skill-based action was at least partially correctly completed; and
   providing, by the computer system, via the network, the information indicating whether the skill-based action was at least partially correctly completed.

2. The method of claim 1, wherein the e-captcha challenge comprises a math problem and the response comprises an attempted solution to the math problem.

3. The method of claim 1, wherein the e-captcha challenge comprises a question to be answered.

4. The method of claim 1, wherein the one or more parameters specify a type of e-captcha being requested, the method further comprising:
   identifying, by the computer system, the e-captcha challenge based on the one or more parameters.

5. The method of claim 4, wherein the type of e-captcha being requested comprises a requested trivia question having a specified subject matter.

6. The method of claim 1, wherein providing the e-captcha challenge comprises:
   providing, by the computer system, executable instructions that are configured to generate a user interface that includes the e-captcha challenge and at least one input configured to receive a response to the e-captcha challenge.

7. The method of claim 6, wherein the at least one input is configured to receive an audio input.

8. The method of claim 7, wherein the skill-based action comprises utterance of one or more words or phrases, and wherein determining whether the skill-based action was at least partially correctly completed comprises: determining, by the computer system, an edit distance between text recognized from the utterance and text of the one or more words or phrases.

9. The method of claim 6, wherein the at least one input is configured to receive a text input, a gesture input, or a multiple choice input.

10. The method of claim 1, the method further comprising:
    storing, by the computer system, an indication of whether the skill-based action was correctly completed in association with identifying information that identifies a user or an end user device associated with the response; and
    determining, by the computer system, a number of times that the user or the end user device associated with the response has failed or passed skill-based actions based on the stored indication, wherein the number of times indicates a proficiency of the user or the end user device at correctly completing e-captcha challenges.

11. The method of claim 1, the method further comprising:
    obtaining identifying information that identifies the user or a device associated with the user;
    generating a score based on the determination of whether the skill-based action was at least partially correctly completed;
    storing the score in association with the user identifying information; and
    generating or updating a profile of the user based at least on the stored score, wherein the profile of the user indicates whether the user possesses the particular skill or indicates a level of the particular skill the user possesses.

12. The method of claim 1, the method further comprising:
    obtaining a pre-stored profile of a subscriber that provides the e-captcha challenge to the user; and
    identifying the e-captcha challenge from among a set of e-captcha challenges associated with the pre-stored profile.

13. A system of distinguishing between computers and humans through enhanced completely automated public turing test to tell computers and humans apart (e-captcha), comprising:
    a computer system having one or more storage devices that stores computer program instructions and one or more physical processors programmed with the computer program instructions that, when executed by the one or more physical processors, cause the computer system to:
    receive a request comprising an e-captcha specification, wherein the e-captcha specification comprises one or more parameters that specify a particular skill needed to solve the e-captcha and a specific domain to which the skill needed to solve the e-captcha is related;
    identify an e-captcha challenge based on the e-captcha specification, wherein the e-captcha challenge includes a skill-based action to be completed to validate that a user is a human user;
    provide the e-captcha challenge via the network responsive to the request;
    receive a response to the e-captcha challenge via the network;
    determine whether the skill-based action was at least partially correctly completed;
    generate information indicating whether the skill-based action was at least partially correctly completed; and provide via the network the information indicating whether the skill-based action was at least partially correctly completed.

14. The system of claim 13, wherein the e-captcha challenge comprises a math problem and the response comprises an attempted solution to the math problem.

15. The system of claim 13, wherein the e-captcha challenge comprises a question to be answered.

16. The system of claim 13, wherein the one or more parameters specify a type of e-captcha being requested, and wherein the computer system is further programmed to:
identify the e-captcha challenge based on the one or more parameters.

17. The system of claim 16, wherein the type of requested e-captcha comprises a requested trivia question having a specified subject matter.

18. The system of claim 13, wherein to provide the e-captcha challenge, the computer system is programmed to:
provide executable instructions that are configured to generate a user interface that includes the e-captcha challenge and at least one input configured to receive a response to the e-captcha challenge.

19. The system of claim 18, wherein the at least one input is configured to receive an audio input.

20. The system of claim 19, wherein the skill-based action comprises utterance of one or more words or phrases, and wherein determining whether the skill-based action was at least partially correctly completed comprises: determine an edit distance between text recognized from the utterance and text of the one or more words or phrases.

21. The system of claim 18, wherein the at least one input is configured to receive a text input, a gesture input, or a multiple choice input.

22. The system of claim 13, wherein the computer system is further programmed to:
store an indication of whether the skill-based action was correctly completed in association with identifying information that identifies a user or an end user device associated with the response; and
determine a number of times that the user or the end user device associated with the response has failed or passed skill-based actions based on the stored indication, wherein the number of times indicates a proficiency of the user or the end user device at correctly completing e-captcha challenges.

* * * * *